Patented May 27, 1924.

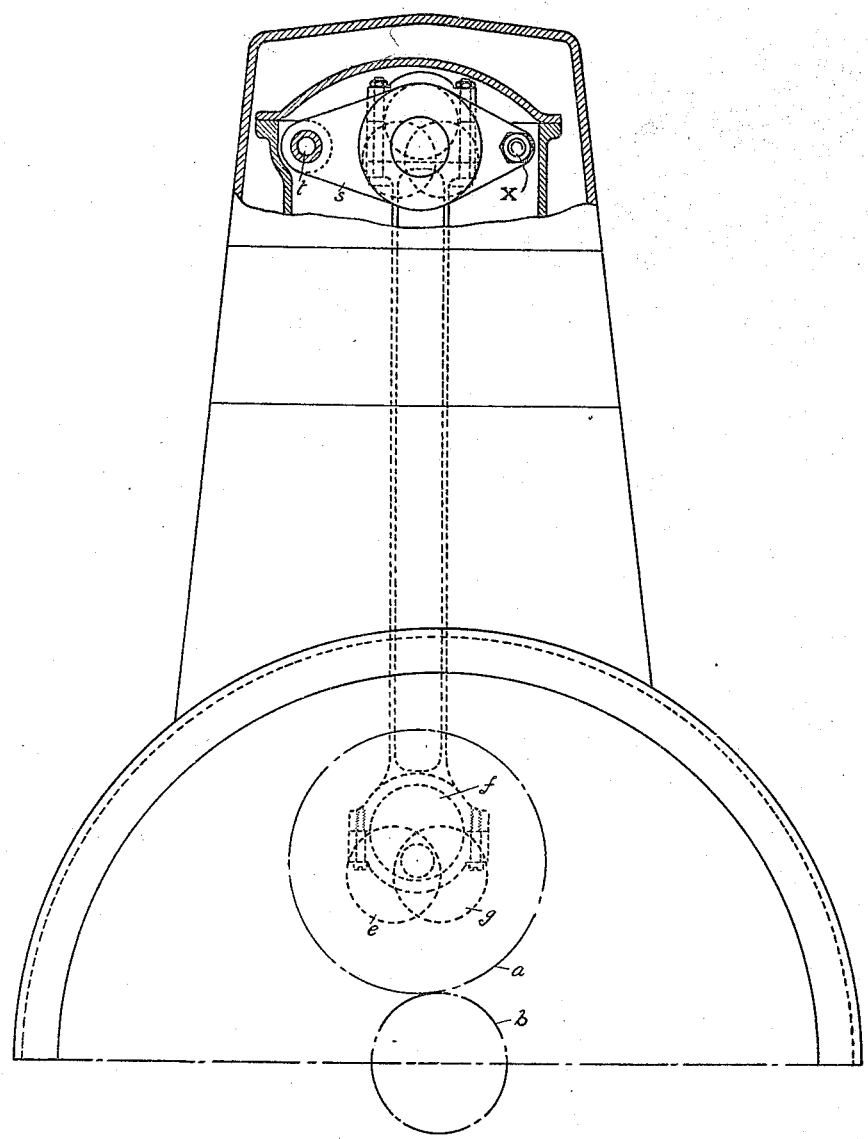
Fig:1.

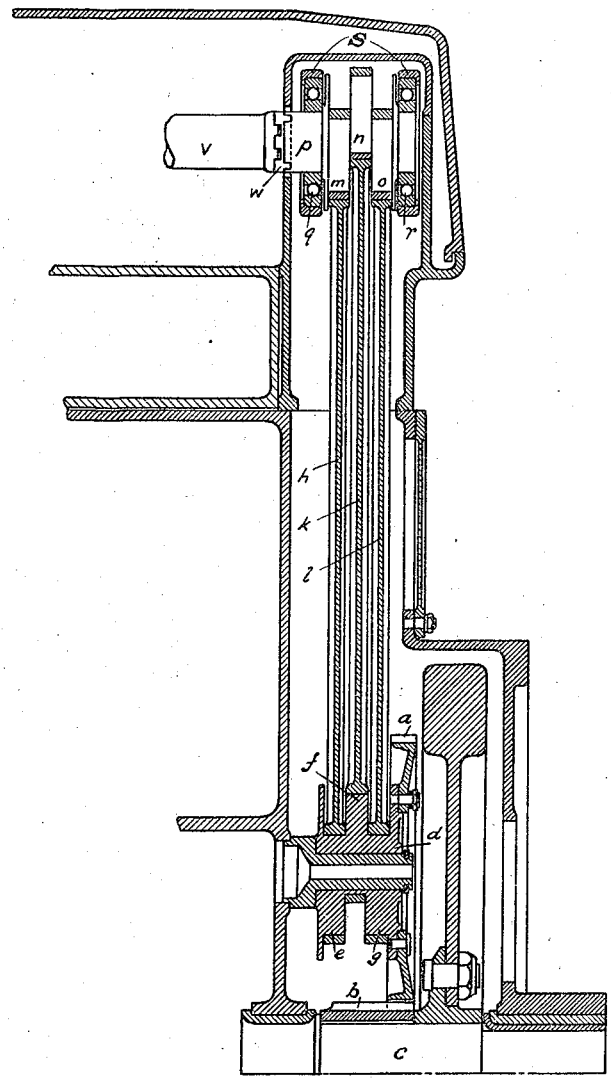
Fig: 2.

1,495,620

UNITED STATES PATENT OFFICE.

JOHN GODFREY PARRY THOMAS, OF PRESTON, ENGLAND.

INTERNAL-COMBUSTION ENGINE.

Application filed March 15, 1921. Serial No. 452,415.

*To all whom it may concern:*

Be it known that I, JOHN GODFREY PARRY THOMAS, a subject of the King of Great Britain and Ireland, residing at 5 Lathom Street, Preston, Lancashire, England, have invented new and useful Improvements in Internal-Combustion Engines, of which the following is a specification.

This invention relates to the transmission of driving power between two shafts by the aid of a plurality of connecting rods joining cranks or eccentrics upon the one shaft to corresponding cranks or eccentrics upon the other shaft. The invention is particularly applicable to the driving of an overhead cam shaft or other auxiliary shaft of an internal combustion engine from the main shaft; and its purpose is to obviate the difficulties that arise through the expansion of the connecting rods upon rise of temperature. To this end my invention includes the combination of two parallel shafts coupled by a plurality of connecting rods, the bearings carrying the one shaft being movable with respect to the other in the direction of the length of the connecting rods. My invention further includes the combination of a shaft in movable bearings coupled by connecting rods to a shaft in fixed bearings, with a third shaft also in fixed bearings having a driving connection with the shaft in movable bearings which is substantially unaffected by movement of the movable bearings. Further developments and embodiments of my invention appear from the description following.

The invention is illustrated in the accompanying drawings as applied to the driving of the cam shaft of an internal combustion engine in which the cam shaft is overhead.

Figure 1 is an end elevation partly in section and partly diagrammatic, and

Figure 2 is a longitudinal section.

As the cam shaft in the usual four-stroke cycle engine has to run at half the speed of the crank shaft, reduction gearing must be introduced into the transmission. In the drawing a 2 to 1 gearing is shown at $a$, $b$ between the crank shaft $c$ and a stub shaft $d$ upon which are formed three eccentrics $e$, $f$, $g$. The sheaves upon these eccentrics are joined by connecting rods $h$, $k$, $l$, to sheaves upon corresponding eccentrics $m$, $n$, $o$ on a shaft $p$, which may be the actual cam shaft.

It will be clear that the eccentrics $e\ f\ g$ might instead be formed upon the crank shaft, and the 2 to 1 gear be interposed between the shaft $p$ and the cam shaft; or there might be gearing between each of the coupled shafts and the crank shaft and cam shaft respectively.

As the connecting rods $h$, $k$, $l$, may be of considerable length it is desirable to make allowance for expansion. This is readily done by mounting one of the two coupled shafts in movable bearings. In the drawing, the bearings $q$, $r$, of the shaft $p$ are carried in arms $s$ pivoted at $t$. The arms $s$ may be joined at their free ends by a bolt $x$. It is then necessary to interpose between the shaft $p$ and the cam shaft $v$, a yielding or flexible coupling, such as the Oldham coupling $w$. Such a coupling is often provided already to facilitate the removal of the cam shaft.

In the example illustrated three eccentrics at 120° are shown; this arrangement gives perfect balance except for a negligible couple, and has the advantage that there are always two eccentrics driving. It is, however, possible to use two cranks or eccentrics only, and to provide suitable balancing weights. Or, of course, a larger number of cranks can be used.

If desired several auxiliary shafts may be driven from a single set of cranks or eccentrics.

What I claim is:

1. In combination a pair of parallel shafts, bearings supporting one of said shafts movable towards the other of said shafts, a plurality of connecting rods coupling said shafts to transmit motion from the one to the other, a third shaft adjacent the shaft in movable bearings and means establishing a driving connection between said third shaft and said shaft in movable bearings for all positions of said bearings.

2. In combination a shaft, pivoted arms, bearings carried by said pivoted arms, a second shaft parallel with the first supported in said bearings, and a plurality of connecting rods forming a driving connection between said shafts.

3. In an internal combustion engine the combination of two parallel shafts, movable bearings supporting one of said shafts so that its distance from the other can vary, a plurality of eccentrics upon each of said shafts those on the one opposite to and corresponding with those on the other, and a plurality of connecting rods transmitting motion between pairs of said eccentrics.

4. In an internal combustion engine the combination with the crank shaft, of an auxiliary shaft, gearing connecting said auxiliary shaft with the crank shaft, a lay shaft, a cam shaft substantially co-axial with said lay shaft, a flexible coupling joining said lay shaft and cam shaft, movable bearings supporting said lay shaft, a plurality of eccentrics upon said auxiliary shaft and lay shaft, and connecting rods transmitting motion between pairs of said eccentrics.

5. In an internal combustion engine the combination of a shaft driven by the engine, pivoted arms, bearings carried by said pivoted arms, a second shaft supported in said bearings parallel with the first, a third shaft approximately in alignment with the second, a flexible coupling joining said second and third shafts, a plurality of corresponding eccentrics upon said first and second shafts, and connecting rods transmitting motion between pairs of said eccentrics.

In testimony whereof I have signed my name to this specification.

JOHN GODFREY PARRY THOMAS.